United States Patent [19]

Pugin et al.

[11] 3,929,719

[45] Dec. 30, 1975

[54] PROCESS FOR THE BULK-DYEING OF LINEAR POLYESTERS

[75] Inventors: André Pugin, Riehen; Kurt Burdeska, Basel; Jost von der Crone, Riehen, all of Switzerland

[73] Assignee: Ciba-Geigy Corporation, Ardsley, N.Y.

[22] Filed: Nov. 8, 1973

[21] Appl. No.: 414,018

[30] Foreign Application Priority Data
Nov. 10, 1972 Switzerland.................. 16399/72

[52] U.S. Cl............................................. 260/40 P
[51] Int. Cl.²........................................... C08K 5/29
[58] Field of Search ..................... 260/40 P, 246

[56] References Cited
UNITED STATES PATENTS 2,571,319  10/1951  Waters et al. ................ 260/40 P
3,635,963  1/1972   Hari et al. .................... 260/246 R

FOREIGN PATENTS OR APPLICATIONS 2,157,519  5/1972  Germany
739,975    8/1966  Canada ....................... 260/246 R

OTHER PUBLICATIONS

Newland et al., Def. Pub. T883028, published 2-23-71.

*Primary Examiner*—Donald E. Czaja
*Assistant Examiner*—S. M. Person
*Attorney, Agent, or Firm*—Vincent J. Cavalieri

[57] ABSTRACT

Process for bulk-dyeing linear polyesters, characterized in that mixtures consisting of at least two dioxazine dyestuffs, which differ in respect of the nature and/or position of their substituents, are used.

Dyeings of improved purity, depth and rub resistance are obtained.

11 Claims, No Drawings

PROCESS FOR THE BULK-DYEING OF LINEAR POLYESTERS

The present invention relates to a process for the bulk-dyeing of linear polyesters with mixtures consisting of at least two dioxazine dyestuffs which differ in respect of the nature and/or position of their substituents.

Mixtures of particular interest are those containing at least two dyestuffs of the formula

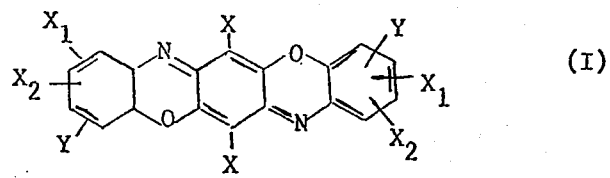

(I)

wherein the X denote chlorine or bromine atoms or alkyl, alkoxy, aralkoxy, alkylmercapto, aralkylmercapto, arylmercapto, alkoxycarbonyl or aroyl groups, the Y denote hydrogen atoms or etherified hydroxyl groups, the $X_1$ denote hydrogen or halogen atoms, etherified hydroxyl groups or trifluoromethyl, aroyl, alkylsulphonyl, phenyl or phenylmercapto groups and the $X_2$ denote hydrogen or halogen atoms, or wherein the $X_1$ and $X_2$ form fused benzene rings, and especially those of the formula

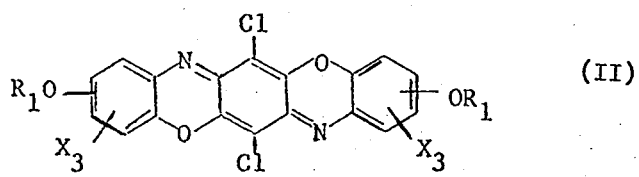

(II)

wherein $R_1$ denotes an aliphatic, alicyclic, araliphatic, aromatic or heterocyclic radical, especially an alkyl or hydroxyalkyl group or an aryloxyalkyl, alkoxyalkyl, acyloxyalkyl, cycloalkyl, aralkyl or aryl group, and $X_3$ denotes a hydrogen or halogen atom or the radical $R_1O-$.

In the above formula (II), $R_1$ preferably denotes an alkyl, cycloalkyl, hydroxyalkyl, alkoxyalkyl or acyloxyalkyl group containing 1 – 6 carbon atoms, a phenalkyl or phenoxyalkyl group of which the alkyl radicals possess 1 – 4 carbon atoms and which can be substituted in the phenyl radical by halogen atoms, or alkyl or alkoxy groups containing 1 – 4 carbon atoms, a phenyl group which can be substituted by halogen atoms or alkyl or alkoxy groups containing 1 – 4 carbon atoms, or a naphthyl group, and $X_3$ has the indicated meaning.

Further preferred mixtures are those containing at least two dyestuffs of the formula

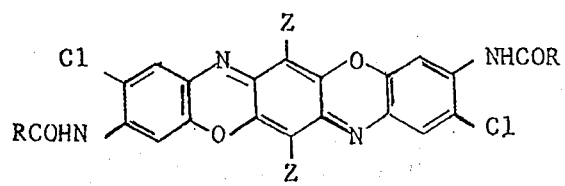

(III)

wherein the Z denote chlorine or bromine atoms, or aryloxy-or alkoxy-carbonyl groups and the R denote alkyl radicals, especially with 1–4 carbon atoms, or aralkyl or aryl radicals.

It is also possible to use mixtures which contain both dyestuffs of the formulae (I) and (II) and dyestuffs of the formula (III), or mixtures which in addition to dyestuffs of the formulae (I), (II) or (III) also contain dioxazine dyestuffs of a different structure.

Preferred mixtures are binary mixtures of the dyestuffs to be used, especially those containing 20 – 80 parts of the dyestuff A and 80 – 20 parts of the dyestuff B, and above all those containing 40 – 60 parts of the dyestuff A and 60 – 40 parts of the dyestuff B, or ternary mixtures containing approximately equal parts of the dyestuffs A, B and C.

In the dyestuffs of the formula (II), the $R_1O-$radicals are preferably in the m-position to the oxygen atom or nitrogen atom of the oxazine ring and preferably contain 1 – 12 carbon atoms.

As examples, there may be mentioned methoxy, ethoxy, propoxy, isopropoxy, butoxy, isobutoxy, tert.-butoxy, amyloxy, hexyloxy, octyloxy, decyloxy or dodecyloxy groups. As examples of hydroxyalkoxy groups, β-hydroxyethoxy, γ-hydroxypropoxy or δ-hydroxybutoxy groups may be mentioned. Amongst the series of the alkoxyalkoxy groups, the β-methoxyethoxy, β-ethoxyethoxy or β-hydroxyethoxyethoxy groups may be mentioned. Radicals derived from polyglycols can also be present. As acyloxyalkoxy groups, β-acetoxyethoxy, β-propoxyethoxy, β-isopropoxyethoxy or β-benzoyloxyethoxy groups may be mentioned. The β-phenoxyethoxy group may be mentioned as an example of an aryloxyalkoxy group and benzyloxy and α- or β-phenylethoxy groups may be mentioned as phenalkoxy groups. Amongst the series of the aryloxy groups, phenoxy, o- or p-chlorophenoxy, 2,4-dichlorophenoxy, 2,5-dichlorophenoxy, 2,4,5-trichlorophenoxy, o- or p-methylphenoxy, 2,4- or 2,6-dimethylphenoxy, 2,4,6-trimethylphenoxy, p-tert.-butylphenoxy, p-amylphenoxy, o-, m- or p-methoxyphenoxy, p-phenylphenoxy, p-phenoxyphenoxy, β-naphthoxy, 2-(5,6,7,8-tetrahydro)-naphthoxy or 1-(1,2,3,4-tetrahydro)-naphthoxy groups may be mentioned. Finally, hydroxyl groups etherified by heterocyclic radicals, for example the tetrahydrofurfuryloxy group, should also be mentioned.

Some examples of dyestuffs of the formula (I) are listed below: 2,6-dimethoxy-9,10-dichloro-triphendioxazine, 4,8-dimethoxy-9,10-dichloro-triphendioxazine, 3,7-dimethoxy-9,10-dichloro-triphendioxazine, 1,5-dimethoxy-9,10-dichloro-triphendioxazine, 2,6-diethoxy-9,10-dichloro-triphendioxazine, 2,6-dipropoxy-9,10-dichloro-triphendioxazine, 2,6-diisopropoxy-9,10-dichloro-triphendioxazine, 2,6-di-($\beta$-hydroxyethoxy)-9,10-dichloro-triphendioxazine, 2,6-di-($\beta$-ethoxyethoxy)-9,10-dichloro-triphendioxazine, 2,6-di-($\beta$-propoxyethoxy)-9,10-dichloro-triphendioxazine, 2,6-di-($\beta$-acetoxyethoxy)-9,10-dichloro-triphendioxazine, 2,6-di-($\beta$-phenoxyethoxy)-9,10-dichloro-triphendioxazine, 2,6-di-[$\beta$-(p-chlorophenoxy)-ethoxy]-9,10-dichloro-triphendioxazine, 2,6-dibenzyloxy-9,10-dichloro-triphendioxazine, 2,6-di-($\beta$-phenethoxy)-9,10-dichloro-triphendioxazine, 2,6-di-[$\beta$-(p-chlorophenylethoxy)]-9,10-dichloro-triphendioxazine, 2,6-di-($\beta$-cyanoethoxy)-9,10-dichloro-triphendioxazine, 2,6-di-($\alpha$-tetrahydrofuryloxy)-9,10-dichloro-triphendioxazine, 2,6-diphenoxy-9,10-dichloro-triphendioxazine, 2,6-di-(o-chlorophenoxy)-9,10-dichloro-triphendioxazine, 2,6-di-(p-chlorphenoxy)-9,10-dichloro-triphendioxazine, 2,6-di-(2',4'-dichlorophenoxy)-9,10-dichloro-triphendioxazine, 2,6-di-(2',4',6'-trichlorophenoxy)-9,10-dichloro-triphendioxazine, 2,6-di-(o-methylphenoxy)-9,10-dichloro-triphendioxazine, 2,6-di-(p-methylphenoxy)-9,10-dichloro-triphendioxazine, 2,6-di-(2',4'-dimethylphenoxy)-9,10-dichloro-triphendioxazine, 2,6-di-(2',6'-dimethylphenoxy)-9,10-dichloro-triphendioxazine, 2,6-di-(2',4',6'-trimethylphenoxy)-9,10-dichloro-triphendioxazine, 2,6-di-(p-tert.-butylphenoxy)-9,10-dichloro-triphendioxazine, 2,6-di-($\beta$-amylphenoxy)-9,10-dichloro-triphendioxazine, 2,6-di-(p-diphenyloxy)-9,10-dichloro-triphendioxazine, 2,6-di-(p-phenoxyphenoxy)-9,10-dichloro-triphendioxazine, 2,6-di-(3'-methoxyphenoxy)-9,10-dichloro-triphendioxazine, 2,6-di-(4'-methoxyphenoxy)-9,10-dichloro-triphendioxazine, 2,6-di-(4'-methylsulphonylphenoxy)-9,10-dichloro-triphendioxazine, 2,6-di-($\beta$naphthoxy)-9,10-dichloro-triphendioxazine, 2,6-di-[2'-(5',6',7',8'-tetrahydro)-naphthoxy]-9,10-dichloro-triphendioxazine, 2,6-di-[1'-(1',2',3',4'-tetrahydro)-naphthoxy]-9,10-dichloro-triphendioxazine, 2,6-dimethoxy-1,5,9,10-tetrachloro-triphendioxazine, 2,6-diethoxy-1,5,9,10-tetrachloro-triphendioxazine, 2,6-dibenzyloxy-1,5,9,10-tetrachloro-triphendioxazine, 2,6-diphenoxy-1,5,9,10-tetrachloro-triphendioxazine, 2,6-dimethoxy-1,5-dibromo-9,10-dichloro-triphendioxazine, 2,6-diphenoxy-1,5-dibromo-9,10-dichloro-triphendioxazine, 2,6-di-(p-chlorophenoxy)-1,5,9,10-tetrachloro-triphendioxazine, 2,6-dimethoxy-3,7,9,10-tetrachloro-triphendioxazine, 2,6-diphenoxy-3,7,9,10-tetrachloro-triphendioxazine, 2,6-di-(p-chlorophenoxy)-3,7,9,10-tetrachloro-triphendioxazine, 2,6-di-(2',4',5'-trichlorophenoxy)-3,7,9,10-tetrachloro-triphendioxazine, 2,6-diphenoxy-3,7-dibromo-9,10-dichloro-triphendioxazine, 3,7-dimethoxy-2,6,9,10-tetrachloro-triphendioxazine, 3,7-diethoxy-2,6,9,10-tetrachloro-triphendioxazine, 1,2,5,6-tetramethoxy-9,10-dichloro-triphendioxazine, 2,6,3,7-tetramethoxy-1,5,9,10-tetrachloro-triphendioxazine, 2,6-dimethoxy-1,5-dicyano-9,10-dichloro-triphendioxazine, 2,6-dimethoxy-1,5-di-(methylsulphonyl)-9,10-dichloro-triphendioxazine, 2,6-di-(p-methylsulphonylphenoxy)-1,5,9,10-tetrachloro-triphendioxazine, 2,6-dibenzoyl-9,10-dichloro-triphendioxazine, 2,6-dimethoxy-9,10-dibenzoyl-triphendioxazine, 2,6-diphenoxy-9,10-dibenzoyl-triphendioxazine, 2,6-dimethoxy-9,10-di(methoxycarbonyl)triphendioxazine, 2,6-diethoxy-9,10-di(methoxycarbonyl)triphendioxazine, 2,6-diphenyl-9,10-dichloro-triphendioxazine, 2,6-di-(p-chlorophenyl)-9,10-dichloro-triphendioxazine, 2,6-diphenoxy-9,10-dimethoxy-triphendioxazine, 2,6-dimethoxy-9,10-diphenoxy-triphendioxazine, 2,6-dimethoxy-9,10-dimethylmercapto-triphendioxazine, 2,6-dimethoxy-9,10-diphenylmercapto-triphendioxazine, 2,6,9,10-tetraphenoxy-triphendioxazine and 2,6-di(phenylmercapto)-9,10-dichloro-triphendioxazine.

In the dyestuffs of the formula (III), R represents, for example, a phenyl group optionally substituted by halogen atoms or alkyl or alkoxy groups containing 1 – 6 carbon atoms, a benzyl group or especially an alkyl group containing 1 – 20 carbon atoms.

As examples there may be mentioned: 2,6-diacetylamino-3,7,9,10-tetrachloro-triphendioxazine, 2,6-diacetylamino-3,7-dichloro-9,10-dibromo-triphendioxazine, 2,6-dipropionylamino-3,7,9,10-tetrachloro-triphendioxazine, 2,6-dibutyrylamino-3,7,9,10-tetrachloro-triphendioxazine, 2,6-dibenzoylamino-3,7,9,10-tetrachloro-triphendioxazine, 2,6-diphenallylamino-3,7,9,10-tetrachloro-triphendioxazine, 2,6-di-(4'-chlorobenzoylamino)-3,7,9,10-tetrachloro-triphendioxazine and 2,6-distearylamino-3,7,9,10-tetrachloro-triphendioxazine.

The dioxazines mentioned are in most cases known compounds which can be manufactured according to the customary processes.

As linear polyesters there may be mentioned especially those obtained by polycondensation of terephthalic acid or its esters with glycols of the formula HO—$(CH_2)_n$—OH, wherein n denotes the number 2 – 10, or with 1,4-di(hydroxymethyl)-cyclohexane or by polycondensation of glycol ethers of hydroxybenzoic acids, for example p-($\beta$-hydroxyethoxy)-benzoic acid. The term linear polyesters also encompasses copolyesters which are obtained by partial replacement of the terephthalic acid by another dicarboxylic acid or a hydroxycarboxylic acid and/or by partial replacement of the glycol by another diol.

However, the polyethylene terephthalates are of particular interest.

The linear polyesters, especially polyethylene terephthalates, which are to be dyed are intimately mixed, appropriately in the form of powders, chips or granules, with the dyestuff. This can be effected, for example, by sprinkling the polyester particles with the finely divided dry dyestuff powder or by treating the polyester particles with a solution of the dyestuff in an organic solvent and subsequently removing the solvent. Instead of the pure dyestuffs it is also possible to use dyestuff preparations, for example preparations containing an ethylhydroxyethylcellulose or a polyterpene resin in addition to the dyestuff. Finally, the dyestuff can also be added directly to the fused polyester or before or during the polycondensation of the polyethylene terephthalate.

The ratio of dyestuff to polyester can vary within wide limits depending on the desired depth of colour. In general it is advisable to use from 0.01 to 2 parts of dyestuff per 100 parts of polyester.

The polyester particles treated in this way are fused in an extruder by known processes and extruded to form various articles, especially films or fibres, or cast to form sheets.

Purer and deeper dyeings are obtained with the mixtures according to the invention than with the individual dyestuffs. The dyed fibres obtained with the mixtures according to the invention are furthermore distinguished by substantially better rub resistance, especially after thermofixing.

In the examples, the parts, unless otherwise stated, denote parts by weight and the percentages denote percentages by weight.

EXAMPLE 1

1,000 parts of polyethylene terephthalate granules and 1 part of triethylphosphite are thoroughly mixed in a mixing drum. After adding 2.5 parts of the dyestuff No. 1 from Table I below and 2.5 parts of dyestuff No. 6 from Table I below, the batch is mixed for a further 15 minutes and then dried for 10 – 12 hours in vacuo at 120°C. The granules treated in this way are spun by the melt spinning process at 250° – 275°C.

The above dyestuff mixture gives red fibres which are of a purer and deeper colour than those obtained using 5 parts of either of the individual components of the dyestuff mixture. Furthermore, the change which has occurred, and the rub resistance, of the dyeings which have been thermofixed for 30 seconds at 210°C (or thermofixed for 30 seconds at 210°C and then post-fixed for 30 minutes at 135°C) are much better in the case of the fibres which have been dyed with the dyestuff mixture than in the case of the fibres dyed with the individual components.

Tables I–III below list a series of dioxazine dyestuffs which are constituents of the mixtures used in Example 2–45.

Table I

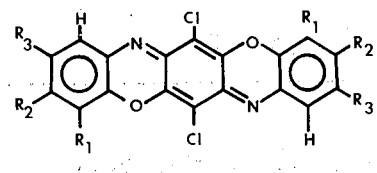

| No. | $R_1$ | $R_2$ | $R_3$ |
|---|---|---|---|
| 1 | Cl | —OCH$_3$ | H |
| 2 | H | 2-Methylphenoxy | H |
| 3 | H | Cl | —OCH$_3$ |
| 4 | H | H | —OCH$_3$ |
| 5 | H | —OC$_2$H$_5$ | H |
| 6 | H | —OCH$_3$ | Cl |
| 7 | H | —OCH$_3$ | H |
| 8 | H | —OCH$_2$CH$_2$OCH$_3$ | Cl |
| 9 | H | H | OC$_2$H$_5$ |
| 10 | H | Phenoxy | H |
| 11 | Cl | —OC$_2$O$_5$ | H |
| 12 | Br | —OCH$_3$ | H |
| 13 | H | —OCH$_2$CH$_2$—CH$_3$ | H |
| 14 | H | Isopropoxy | H |
| 15 | H | —O—CH$_2$CH$_2$—OCH$_3$ | H |
| 16 | H | Benzyloxy | H |
| 17 | H | β—Phenoxyethoxy | H |
| 18 | H | —OCH$_2$—CH$_2$—OH | H |
| 19 | H | —OCH$_2$CH$_2$—OCOCH$_3$ | H |
| 20 | Cl | —OCH$_2$CH$_2$—OCH$_2$CH$_2$CH$_3$ | H |
| 21 | H | 2-Methylphenoxy | Cl |
| 22 | H | 2-Methoxyphenoxy | Cl |
| 23 | Cl | 4-Methylsulphonylphenoxy | H |
| 24 | Br | 2,4,5-Trichlorophenoxy | H |
| 25 | H | 4-Phenylphenoxy | —OCH$_3$ |
| 26 | H | 4-Phenoxyphenoxy | —OC$_2$H$_5$ |
| 27 | H | β-Naphthoxy | —OCH$_3$ |
| 28 | H | 2,6-Dimethylphenoxy | —OCH$_2$—CH$_2$OH |
| 29 | H | 4-Chlorophenoxy | —OCH$_3$ |
| 30 | H | 4-Amylphenoxy | —OC$_2$H$_5$ |
| 31 | H | 4-Methoxyphenoxy | —OCH$_2$CH$_2$CH$_3$ |
| 32 | H | 2,4-Dimethylphenoxy | —OCH$_3$ |
| 33 | H | 2-Tetrahydrofuryl | H |
| 34 | —OCH$_3$ | H | H |
| 35 | —CN | —OCH$_3$ | H |
| 36 | Cl | —OCH$_3$ | —OCH |
| 37 | —SO$_2$CH$_3$ | —OCH$_3$ | H |
| 38 | H | α-(1,2,3,4-Tetrahydro)-naphthoxy | H |
| 39 | H | 4-Phenylphenoxy | Cl |
| 40 | H | —OC$_2$H$_5$ | —CF$_3$ |
| 41 | H | Phenoxy- | —CF$_3$ |
| 42 | H | 2-sec.-Butyl-4-tert.-butylphenoxy | H |
| 43 | H | " | —Cl |
| 44 | H | 4-Chlorophenyl-mercapto | —OCH$_3$ |
| 45 | H | —Cl | —OC$_2$H$_5$ |
| 46 | H | —OC$_2$H$_5$ | —Cl |
| 47 | Cl | Cl | H |
| 48 | Cl | H | Cl |
| 49 | Cl | OCH$_2$CH$_2$O—iso—C$_3$H$_7$ | H |
| 50 | H | OCH$_2$CH$_2$OC$_3$H$_7$ | Cl |
| 51 | Cl | OCH$_2$CH$_2$OC$_4$H$_9$ | H |
| 52 | H | OCH$_2$CH$_2$OC$_2$H$_5$ | H |
| 53 | H | OCH$_2$CH$_2$OC$_4$H$_9$ | H |

Table II

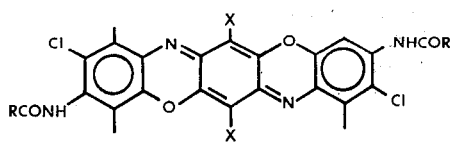

| No. | R | X |
|---|---|---|
| 1 | CH$_3$ | Cl |
| 2 | —C$_2$H$_5$ | Cl |
| 3 | —(CH$_2$)$_4$—CH$_3$ | Cl |
| 4 | (CH$_2$)$_{10}$CH$_3$ | Cl |
| 5 | (CH$_2$)$_{16}$—CH$_3$ | Cl |
| 6 | Benzyl | Cl |
| 7 | Phenyl | Cl |
| 8 | 4-Chlorophenyl | Cl |
| 9 | Phenyl | COOC$_2$H$_5$ |
| 10 | —CH$_3$ | COOC$_2$H$_5$ |
| 11 | CH$_3$ | Br |

Table III

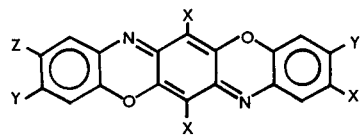

| No. | X | Y | Z |
|---|---|---|---|
| 1 | Br | Phenoxy | H |
| 2 | Br | —O—C$_2$H$_5$ | Cl |
| 3 | OCH$_3$ | 2-Methylphenoxy | H |
| 4 | —SC$_2$H$_5$ | Phenoxy | H |
| 5 | 4-Chlorophenoxy | —OC$_2$H$_5$ | H |
| 6 | Phenoxy | 4-Methylphenoxy | H |
| 7 | " | 4-Methoxyphenoxy | OCH$_3$ |
| 8 | 4-Methylphenoxy | 4-Methylphenoxy | OCH$_3$ |
| 9 | 4-Chlorophenyl-mercapto | —OC$_2$H$_5$ | H |
| 10 | —SCH$_3$ | Phenoxy | H |
| 11 | —SCH$_3$ | 4-Methoxyphenoxy | H |
| 12 | COOC$_2$H$_5$ | —OC$_2$H$_5$ | H |
| 13 | 4-Chlorobenzoyl | Phenoxy | Cl |
| 14 | Benzoyl | —OCH$_3$ | H |

Table III-continued

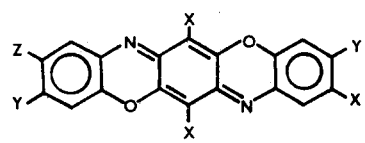

| No. | X | Y | Z |
|---|---|---|---|
| 15 | " | —OC$_2$H$_5$ | H |
| 16 | " | —OCH$_3$ | Cl |
| 17 | —CH$_3$ | —OC$_2$H$_5$ | H |
| 18 | —CH$_3$ | —OCH$_3$ | Cl |

EXAMPLES 2 – 43

Table IV below describes the use of further mixtures obtained by mixing the stated parts of dyestuffs A, B and C.

Table IV

| Example | Parts | Dyestuff A No. | Table | Parts | Dyestuff B No. | Table | Parts | Dyestuff C No. | Table | Shade in polyester |
|---|---|---|---|---|---|---|---|---|---|---|
| 2 | 2.5 | 1 | II | 2.5 | 6 | I | | | | red |
| 3 | 2.5 | 1 | II | 2.5 | 7 | I | | | | red |
| 4 | 2.5 | 1 | II | 2.5 | 15 | I | | | | red |
| 5 | 2.5 | 1 | II | 2.5 | 5 | I | | | | red |
| 6 | 2.5 | 7 | II | 2.5 | 15 | I | | | | red |
| 7 | 2.5 | 5 | II | 2.5 | 15 | I | | | | red |
| 8 | 2.5 | 7 | II | 2.5 | 5 | I | | | | red |
| 9 | 2.5 | 4 | II | 2.5 | 5 | I | | | | claret |
| 10 | 2.5 | 4 | II | 2.5 | 9 | I | | | | claret |
| 11 | 2.5 | 4 | II | 2.5 | 7 | I | | | | claret |
| 12 | 2.5 | 2 | II | 2.5 | 7 | I | | | | yellow-red |
| 13 | 2.5 | 3 | II | 2.5 | 6 | I | | | | bluish-tinged red |
| 14 | 2.5 | 1 | II | 2.5 | 4 | I | | | | claret |
| 15 | 2.5 | 4 | I | 2.5 | 9 | I | | | | claret |
| 16 | 2.5 | 2 | I | 2.5 | 1 | I | | | | red |
| 17 | 2.5 | 1 | II | 2.5 | 1 | I | | | | bluish-tinged red |
| 18 | 2.5 | 1 | I | 2.5 | 13 | I | | | | red |
| 19 | 2.5 | 13 | I | 2.5 | 7 | I | | | | red |
| 20 | 2.5 | 13 | I | 2.5 | 5 | I | | | | red |
| 21 | 1.66 | 1 | I | 1.66 | 7 | I | 1.66 | 5 | I | red |
| 22 | 2.5 | 52 | I | 2.5 | 53 | I | | | | red |
| 23 | 2.5 | 17 | I | 2.5 | | | | | | red |
| 24 | 2.5 | 50 | I | 2.5 | | | | | | red |
| 25 | 2.5 | 48 | I | 2.5 | 49 | I | | | | orange |
| 26 | 2 | 25 | I | 2 | 26 | I | 2 | 27 | I | bluish-tinged red |
| 27 | 2 | 41 | I | 2 | 42 | I | | | | yellowish-tinged red |
| 28 | 2 | 14 | I | 2 | 1 | I | 2 | 48 | I | yellowish-tinged red |
| 29 | 2 | 15 | I | 2 | 17 | I | | | | red |
| 30 | 2 | 45 | I | 2 | 4 | I | | | | bluish-tinged red |
| 31 | 2 | 1 | II | 1 | 4 | II | | | | claret |

Table IV-continued

| Example | Parts | Dyestuff A No. | Table | Parts | Dyestuff B No. | Table | Parts | Dyestuff C No. | Table | Shade in polyester |
|---|---|---|---|---|---|---|---|---|---|---|
| 32 | 2 | 1 | II | 2 | 10 | II | | | | claret |
| 33 | 2 | 3 | II | 2 | 8 | II | | | | claret |
| 34 | 2 | 2 | II | 1 | 6 | II | 1 | 9 | II | bluish-tinged red |
| 35 | 2 | 6 | III | 3 | 8 | III | | | | red |
| 36 | 2.5 | 4 | III | 2.5 | 10 | III | | | | bluish-tinged red |
| 37 | 2 | 9 | III | 2 | 5 | III | | | | claret |
| 38 | 2.5 | 4 | III | 2.5 | 9 | III | | | | claret |
| 39 | 2 | 3 | III | 3 | 9 | III | | | | brown |
| 40 | 2 | 1 | III | 2 | 2 | III | 2 | 14 | III | red |
| 41 | 2 | 12 | III | 1 | 16 | III | 2 | 17 | III | red |
| 42 | 2 | 3 | I | 2 | 3 | II | 2 | 4 | III | bluish-tinged red |

EXAMPLE 43

If a mixture of
1.25 parts of the dyestuff No. 1, Table I,
1.25 parts of the dyestuff No. 3, Table I,
1.25 parts of the dyestuff No. 6, Table I and
1.25 parts of the dyestuff No. 7, Table I
is used, a bluish-tinged red dyeing is obtained in polyesters.

EXAMPLE 44

If a mixture of
1.5 parts of the dyestuff No. 3, Table I,
1.5 parts of the dyestuff No. 20, Table I,
1.5 parts of the dyestuff No. 10, Table II and
1.5 parts of the dyestuff No. 12, Table III
is used, a bluish-tinged red dyeing is obtained in polyesters.

EXAMPLE 45

If a mixture of
5 parts of the dyestuff No. 19, Table 1 and
5 parts of the dyestuff No. 50, Table 1
is used, a red dyeing, which is fast to thermofixing, is obtained in polyesters.

EXAMPLE 46

If a mixture of
5 parts of the dyestuff No. 17, Table 1,
5 parts of the dyestuff No. 50, Table 1 and
5 parts of the dyestuff No. 51, Table 1
is used, a full dyeing, which is fast to thermofixing, is obtained in polyesters.

What we claim is:
1. Process for bulk-dyeing linear polyesters, characterised in that mixtures containing at least 2 dyestuffs of the formula

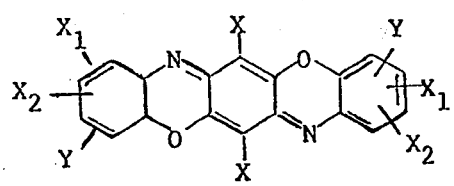

wherein the X denote chlorine or bromine atoms or alkyl, alkoxy, aralkoxy, alkylmercapto, aralkylmercapto, arylmercapto, alkoxycarbonyl or aroyl groups, the Y denote hydrogen atoms or etherified hydroxyl groups, the $X_1$ denote hydrogen or halogen atoms, etherified hydroxyl groups or trifluoromethyl, aroyl, alkylsulphonyl, phenyl or phenylmercapto groups and the $X_2$ denote hydrogen or halogen atoms, or wherein the $X_1$ and $X_2$ form fused benzene rings, are used.

2. Process according to claim 1, characterised in that mixtures containing at least 2 dyestuffs of the formula

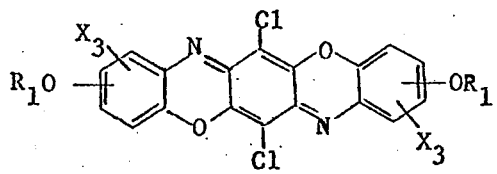

wherein $R_1$ denotes an aliphatic, alicyclic, araliphatic, aromatic or heterocyclic radical, especially an alkyl or hydroxyalkyl group or an aryloxyalkyl, alkoxyalkyl, acyloxyalkyl, cycloalkyl, aralkyl or aryl group, and $X_3$ denotes a hydrogen or halogen atom or the radical $R_1O-$, are used.

3. Process according to claim 2, characterised in that mixtures containing at least 2 dyestuffs of the indicated formula, wherein $R_1$ preferably denotes an alkyl, cycloalkyl, hydroxyalkyl, alkoxyalkyl or acyloxyalkyl group containing 1 – 6 carbon atoms, a phenalkyl or phenoxyalkyl group of which the alkyl radicals possess 1 – 4 carbon atoms and which can be substituted in the phenyl radical by halogen atoms, or alkyl or alkoxy groups containing 1 – 4 carbon atoms, a phenyl group which can be substituted by halogen atoms or alkyl or alkoxy groups containing 1 – 4 carbon atoms, or a naphthyl group, and $X_3$ has the indicated meaning, are used.

4. Process according to claim 1, characterised in that mixtures containing at least two dyestuffs of the formula

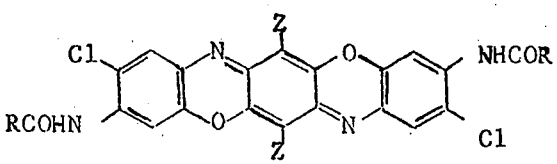

wherein the Z denote chlorine or bromine atoms or aryloxy-or alkoxycarbonyl groups and the R denote alkyl, aralkyl or aryl radicals, are used.

5. Process according to claim 4, characterised in that mixtures of dyestuffs of the indicated formula, wherein R denotes an alkyl group containing 1 – 6 carbon atoms, are used.

6. Process according to claim 1, characterised in that mixtures of dyestuffs of the formula

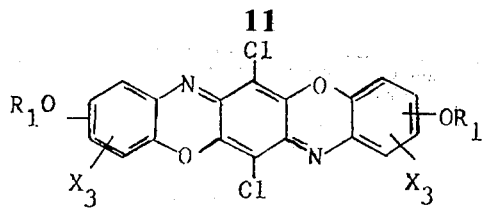

wherein $R_1$ denotes an aliphatic, alicyclic, araliphatic, aromatic or heterocyclic radical, especially an alkyl or hydroxyalkyl group or an aryloxyalkyl, alkoxyalkyl, acyloxyalkyl, cycloalkyl, aralkyl or aryl group, and $X_3$ denotes a hydrogen or halogen atom or the radical $R_1O-$, with those of the formula

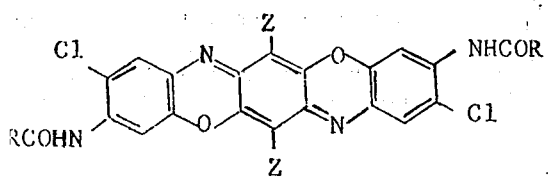

the symbols in the formulae indicated having the meaning indicated in claim 4, are used.

7. Process according to claim 1, characterised in that mixtures containing at least two dyestuffs of the formula

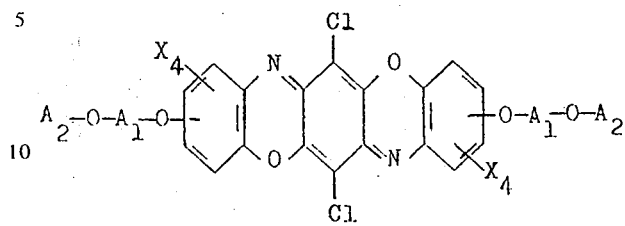

wherein $A_1$ denotes an alkylene group containing 2 – 4 C atoms and $A_2$ denotes an alkyl group containing 1 – 4 C atoms, a phenyl radical optionally substituted by chlorine atoms, alkyl or alkoxy groups containing 1 – 6 C atoms, phenoxy or phenyl groups, or an alkanoyl group containing 1 – 4 C atoms, and $X_4$ denotes an H or chlorine atom, are used.

8. A process according to claim 1, characterized in that mixtures containing the dyestuffs of the formulae

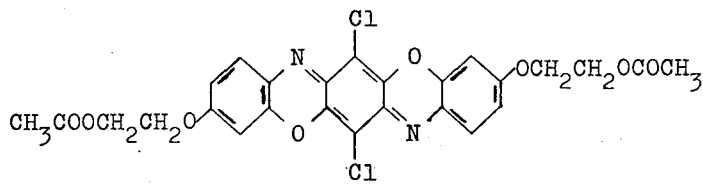

and

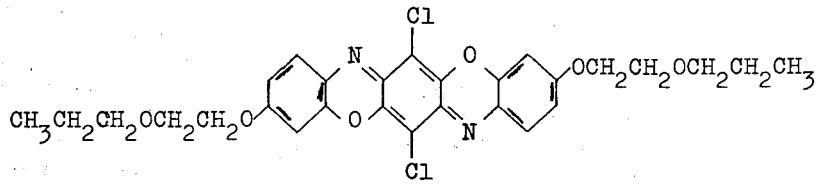

9. A process according to claim 4, characterized in that mixtures containing the dyestuffs of the formulae

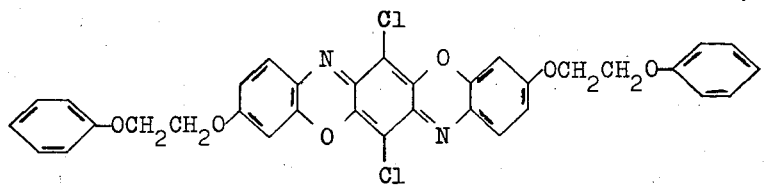

and

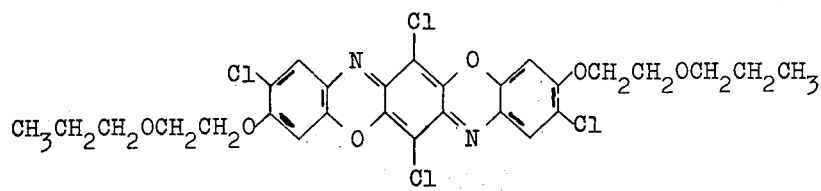

and

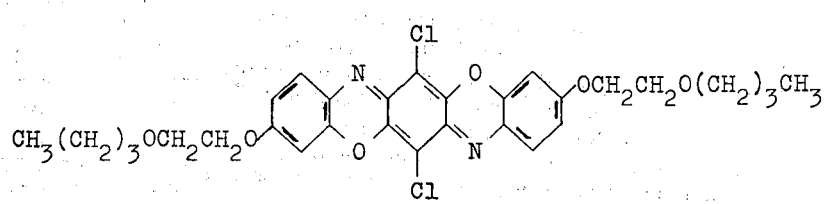

10. The dyed linear polyesters obtained according to claim 1.

11. Dyed linear polyesters containing one of the dyestuff mixtures defined in claim 2.

* * * * *